United States Patent [19]
Havens et al.

[11] Patent Number: 6,037,283
[45] Date of Patent: Mar. 14, 2000

[54] PLUS POWER, PHOTOCHROMATIC GLASS LENSES

[75] Inventors: Thomas G. Havens, Painted Post; David J. Kerko, Corning, both of N.Y.

[73] Assignee: Corning Incorporated, Corning, N.Y.

[21] Appl. No.: 09/135,928

[22] Filed: Aug. 18, 1998

[51] Int. Cl.⁷ ........................................ C03C 4/06
[52] U.S. Cl. .................. 501/13; 501/59; 65/323
[58] Field of Search ........................ 501/13, 59; 65/32.3

[56] References Cited

U.S. PATENT DOCUMENTS

| | | | |
|---|---|---|---|
| 4,608,349 | 8/1986 | Kerko et al. | 501/13 |
| 5,256,601 | 10/1993 | Kerko et al. | 501/13 |
| 5,426,077 | 6/1995 | Brocheton et al. | 501/13 |
| 5,482,902 | 1/1996 | Claunch et al. | 501/13 |
| 5,491,117 | 2/1996 | Kerko et al. | 501/13 |

*Primary Examiner*—Karl Group
*Attorney, Agent, or Firm*—Milton M. Peterson

[57] ABSTRACT

A photochromic glass lens and method of producing such lens, the lens having a plus power and a composition consisting essentially of:

| | | | |
|---|---|---|---|
| $SiO_2$ | 54–58% | Ag | 0.20–0.33% |
| $B_2O_3$ | 18–22% | Cl | 0.30–0.50% |
| $Al_2O_3$ | 7–8% | Br | 0.04–0.14% |
| $Li_2O$ | 3.75–4.5% | CuO | 0.007–0.012% |
| $Na_2O$ | 0–1% | PbO | 0–0.08% |
| $TiO_2$ | 0–2% | $Sb_2O_3$ | 0–0.20% |
| $ZrO_2$ | 2–4.5% | $K_2O$ | 5.5–7.5% | and wherein the mole ratio of $Li_2O:Na_2O$ is =>9:1.

5 Claims, 1 Drawing Sheet

PLUS POWER, PHOTOCHROMATIC GLASS LENSES

FIELD OF THE INVENTION

Photochromic glass lenses having a plus power and method of production.

BACKGROUND OF THE INVENTION

U.S. Pat. No. 4,608,349 (Kerko et al.) describes glasses that have a photochromic potential, and that are characterized by a $Li_2O:Na_2O$ molar ratio of at least 9:1. These glasses are designed to produce photochromic lenses that have refractive indices corrected for ophthalmic use.

Such lenses darken to a value less than 35% when exposed to solar simulated radiation, and rapidly fade when the exposure is removed. Composition-wise, the glasses consist essentially of, as calculated in weight percent on the oxide basis:

| | | | |
|---|---|---|---|
| $SiO_2$ | 54–58% | Ag | 0.20–0.33% |
| $B_2O_3$ | 18–22% | Cl | 0.30–0.50% |
| $Al_2O_3$ | 7–8% | Br | 0.40–0.14% |
| $Li_2O$ | 3.75–4.5% | CuO | 0.007–0.012% |
| $Na_2O$ | 0–1% | PbO | 0–0.08% |
| $TiO_2$ | 0–2% | $Sb_2O_3$ | 0–0.20% |
| $ZrO_2$ | 12 2–4.5% | $K_2O$ | 5.5–7.5% | wherein the mole ratio of $Li_2O:Na_2O$ is =>9:1.

Glasses that are potentially photochromic require a heat treatment to develop photochromic behavior. The -349 patent teaches heat treatments at temperatures in the range of 550–660° C. for times ranging from 10–30 minutes. However, the exemplary heat treatments, set forth in the patent, range from 625–660° C. for 30 minutes.

A heat treating cycle in the range of 625–630° C. for thirty minutes is employed commercially to produce minus power lenses from these glasses. Such lenses have thicknesses in the range of 1.5–1.8 mm., and are used to treat patients having myopia.

Plus power lenses are needed for patients afflicted with hyperopia (far sightedness). These lenses require a center thickness greater than 2 mm. The same glass and heat treatment can be used to produce the thicker, plus power lens. However, the thicker lens may become too dark for some applications in cold weather. For example, at 0° C., the glass darkens to 2–3% transmittance.

It is, of course, possible to produce plus power lenses in other types of photochromic glass with a standard heat treatment. However, such glass lenses would not have the desirable properties obtained with the glasses of the Kerko et al. -349 patent. Further, such practice would mean frequent composition changes if one melting unit were employed. The alternative would be to use separate melting units, an alternative that is equally unattractive.

Ophthalmic suppliers are reluctant to carry a line of lenses unless they can carry a full line of both plus and minus power lenses. Thus, there is a reluctance to carry the line of minus power, glass lenses of the Kerko et al. -349 patent in the absence of a corresponding line of plus power lenses. This has led to the need for a convenient means of producing a full line of lenses in one of these glasses.

It is a basic purpose of the present invention to meet this need.

A further purpose is to provide a full line of ophthalmic glass lenses employing a single glass having the several characteristics set forth in the Kerko et al. -349 patent.

Another purpose is to provide a fast fading, plus power, ophthalmic lens.

SUMMARY OF THE INVENTION

The invention resides in part in a photochromic glass lens having a plus power, a thickness greater than 2 mm., and a composition consisting essentially of, about, as calculated on the oxide basis in weight percent:

| | | | |
|---|---|---|---|
| $SiO_2$ | 54–58% | Ag | 0.20–0.33% |
| $B_2O_3$ | 18–22% | Cl | 0.30–0.50% |
| $Al_2O_3$ | 7–8% | Br | 0.04–0.14% |
| $Li_2O$ | 3.75–4.5% | CuO | 0.007–0.012% |
| $Na_2O$ | 0–1% | PbO | 0–0.08% |
| $TiO_2$ | 0–2% | $Sb_2O_3$ | 0–0.20% |
| $ZrO_2$ | 2–4.5% | $K_2O$ | 5.5–7.5% | and wherein the mole ratio of $Li_2O:Na_2O$ is =>9:1.

The invention further resides in a method of producing such plus power lenses which comprises melting a glass having a composition, as calculated from the glass batch, consisting essentially of:

| | | | |
|---|---|---|---|
| $SiO_2$ | 54–58% | Ag | 0.20–0.33% |
| $B_2O_3$ | 18–22% | Cl | 0.30–0.50% |
| $Al_2O_3$ | 7–8% | Br | 0.04–0.14% |
| $Li_2O$ | 3.75–4.5% | CuO | 0.007–0.012% |
| $Na_2O$ | 0–1% | PbO | 0–0.08% |
| $TiO_2$ | 0–2% | $Sb_2O_3$ | 0–0.20% |
| $ZrO_2$ | 2–4.5% | $K_2O$ | 5.5–7.5% | and wherein the mole ratio of $Li_2O:Na_2O$ is =>9:1, molding a plus power lens of a thickness greater than 2 mm. from the glass, and heat treating the lens at a temperature of not over about 610° C. for a time of 15–45 minutes to develop photochromic properties in the glass.

PRIOR ART

Figure 1:
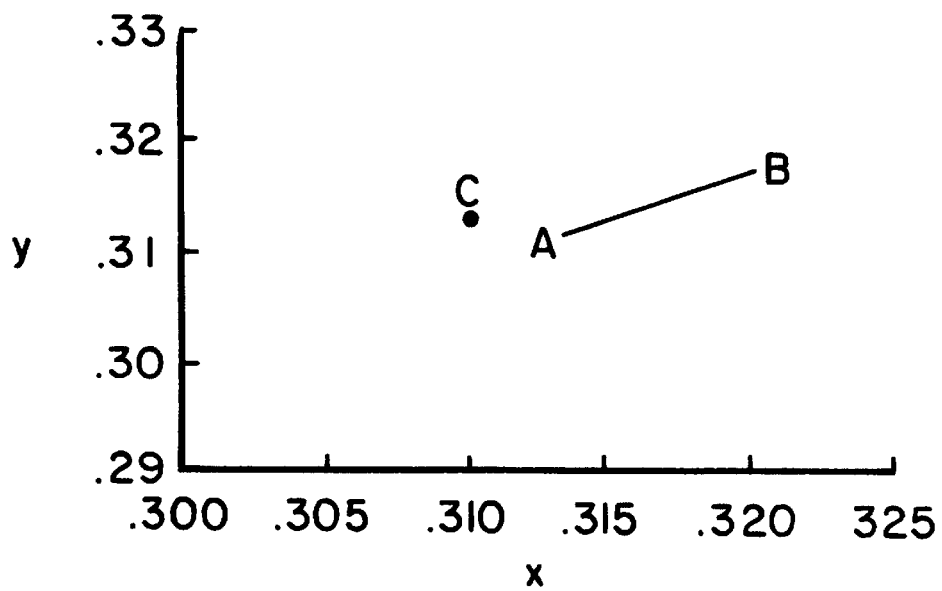
FIGS. 1 and 2 in the accompanying drawing are chromaticity diagrams illustrating the chromaticity characteristics made available in accordance with the present invention.

Literature of possible relevance is supplied separately.

DESCRIPTION OF THE INVENTION

The present invention arose from a need for a plus power lens in the field of photochromic glasses disclosed in U.S. Pat. No. 4,608,349 noted earlier. A line of minus power lenses, but not plus power lenses, was available in this glass. In spite of the superior photochromic properties of the glass, acceptance of the minus power lenses was hampered by the desire in the trade for a full product line of lenses.

We have now found that a plus power lens can be produced from the same glass used in producing the minus power lenses by simply employing a modified heating schedule. This discovery avoids the need for melting two different glasses.

The new plus power lens possesses the characteristic features of the earlier minus power lenses. These features include a fully darkened transmission at 25° C. that does not exceed about 35%, and a rapid fading rate such that the fully darkened lens at 25° C. fades by at least 35 percentage points in five minutes. The glass is refractive index-corrected to a standard ophthalmic value of 1.523. For further details as to compositions and properties, reference is made to the -349 patent which is incorporated in its entirety by reference.

The plus power lens of our present invention is produced by employing a significantly modified heat treating schedule to develop the photochromic properties in the lens. The time-temperature schedule is adjusted downward to a substantial degree. The standard employed for minus power lenses is in the range of 625–630° C. for about 30 minutes.

To produce a satisfactory plus power lens, we find it necessary to reduce the thermal treatment to a temperature of not over about 610° C. for 15 to 45 minutes.

The thermal processing is conveniently carried out in a standard glass heat treating lehr. Such lehrs are commonly adjusted to operate on a time schedule of about 30 minutes. Therefore, we find it convenient to use a temperature of about 595° C. for about 30 minutes to develop the desired photochromic properties in a standard plus power lens. The same lehr can be used for thermal processing minus power lenses. However, the temperature must be raised to near 630° C. for a thirty minute time to achieve comparable properties when the glass is to be used for minus power lenses. It is, of course, a matter of no more than an hour to adjust a lehr temperature, as contrasted to days to make a composition change in a glass melting unit.

We have further found that the degree to which a photochromic glass darkens can be progressively decreased by decreasing the temperature for a given time of treatment. Thus, we are able to produce what are commonly referred to as "comfort" lenses. To produce such a lens, we may employ a temperature of about 575° C. for a thirty minute treatment to develop photochromic behavior in a lens.

In the course of developing the invention, a number of different temperatures ranging from 575–610° C. were employed for lens treatments at a heat treating time of 30 minutes. Lenses of both 2 and 3.7 mm. thickness were employed in the test.

The lenses were molded in conventional manner from a glass in accordance with the -349 composition patent. That glass, identified as PGTD, had the following calculated composition in parts by weight:

| | | | |
|---|---|---|---|
| $SiO_2$ | 55.5 | Ag | 0.24 |
| $B_2O_3$ | 20.6 | Cl | 0.40 |
| $Al_2O_3$ | 7.4 | Br | 0.13 |
| $Li_2O$ | 4.3 | CuO | 0.008 |
| $Na_2O$ | 0.8 | PbO | 0.03 |
| $TiO_2$ | 1.1 | $Sb_2O_3$ | 0.003 |
| $ZrO_2$ | 4.1 | $K_2O$ | 6.1 |

The glass batch was prepared by mixing conventional glass-making materials, including carbonates, nitrates, oxides and halides, in known manner and melting in a commercial melting tank.

Properties were measured on representative lenses, and are shown in the TABLE that follows.

Also measured were properties for a 1.5 mm. thick, minus power lens of the PGTD glass, 2.0 mm. and a 4.1 mm. thick, lenses of an earlier photochromic glass sold under the mark PHOTOGRAY EXTRA® and shown as PGX.

In the TABLE, treatment temperature is shown as T in degrees centigrade (° C.); maximum lens thickness as Thick in mm; the percentage points in transmittance regained five minutes after removal from the darkened state as F5; and initial transmittance of the lens as To in percent. The x and y values are measured on a darkened glass.

| | T (° C.) | Thick (mm.) | x | y | F5 | To |
|---|---|---|---|---|---|---|
| PGTD | 630 | 1.5 | 0.3092 | 0.3110 | 37.16 | 90.7 |
| | 595 | 2.0 | 0.3193 | 0.3170 | 41.46 | 91.67 |
| | 600 | 2.0 | 0.3170 | 0.3158 | 42.44 | 91.60 |
| | 605 | 2.0 | 0.3138 | 0.3141 | 40.84 | 91.50 |
| | 610 | 2.0 | 0.3127 | 0.3135 | 38.80 | 91.40 |
| | 575 | 3.7 | 0.3295 | 0.3282 | 30.60 | 91.30 |
| | 580 | 3.7 | 0.3311 | 0.3268 | 36.40 | 91.30 |
| | 590 | 3.7 | 0.3263 | 0.3218 | 40.80 | 91.20 |
| | 595 | 3.7 | 0.3237 | 0.3201 | 41.20 | 91.20 |
| | 600 | 3.7 | 0.3228 | 0.3196 | 40.70 | 91.20 |
| | 605 | 3.7 | 0.3182 | 0.3168 | 37.60 | 91.10 |
| | 610 | 3.7 | 0.3161 | 0.3157 | 34.80 | 90.44 |
| PGX | 655 | 4.1 | 0.3171 | 0.3201 | 35.34 | 90.08 |
| | 655 | 2.0 | 0.3155 | 0.3572 | 36.00 | 91.00 |

Figure 2:
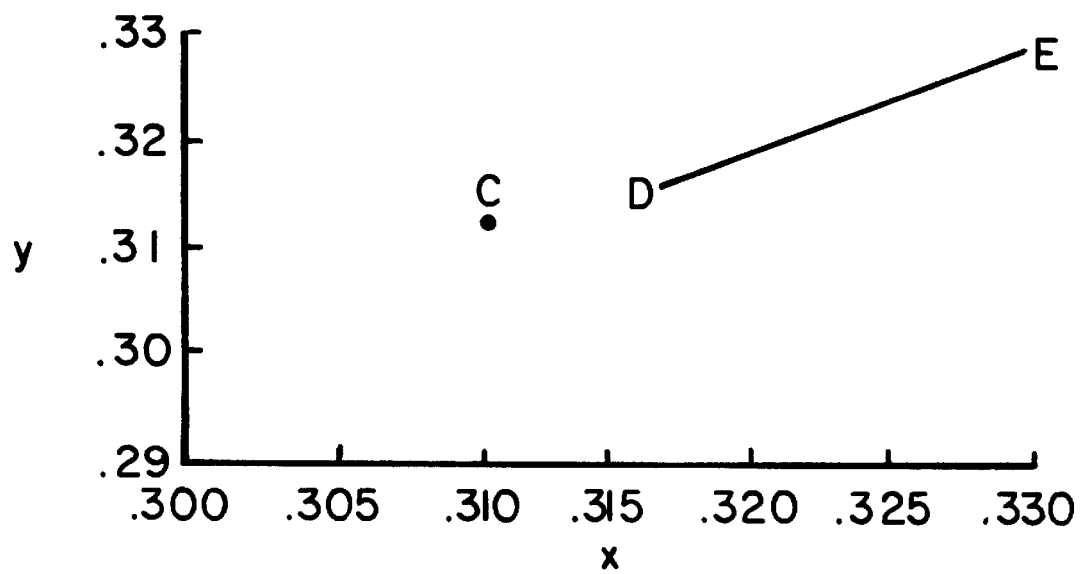

FIGS. 1 and 2 in the accompanying drawing show an xy chromaticity diagram based on the 1931 CIE trichromatic colorimetric system. They illustrate the relationship of the xy coordinates for the lenses from the TABLE with respect to illuminant C shown at C, and having coordinates of x=0.3101 and y=0.3127. X values are plotted on the horizontal axis in each FIGURE, and y values are plotted on the verticle axis.

XY coordinates measured on 2 mm. thick lenses, as shown in the TABLE, are plotted in FIG. 1. The FIGURE shows the progressive increase in both x and y values as the treatment temperature is decreased from 610° C. (point A) to 595° C. (point B). FIG. 2 shows the same progressive increase in the coordinate values from 4.7 mm. thick lenses. These lenses were treated over a broader temperature range of 575° C. (point E) to 610° C. (point D).

We claim:

1. An ophthalmic lens of photochromic glass, having a plus power, having a center thickness greater than 2 mm., and having a composition consisting essentially of:

| | | | |
|---|---|---|---|
| $SiO_2$ | 54–58% | Ag | -0.20–0.33% |
| $B_2O_3$ | 18–22% | Cl | 0.30–0.50% |
| $Al_2O_3$ | 7–8% | Br | 0.04–0.14% |
| $Li_2O$ | 3.75–4.5% | CuO | 0.007–0.012% |
| $Na_2O$ | 0–1% | PbO | 0–0.08% |
| $TiO_2$ | 0–2% | $Sb_2O_3$ | 0–0.20% |
| $ZrO_2$ | 2–4.5% | $K_2O$ | 5.5–7.5% | and wherein the mole ratio of $Li_2O:Na_2O$ is =>9:1.

2. An ophthalmic lens in accordance with claim 1 having a refractive index of 1.523, having a fully darkened transmission less than 35%, and fading within a period of five minutes to a transmission at least 35 percentage points greater than the darkened transmission.

3. A method of producing an ophthalmic lens having photochromic properties which comprises providing a glass having a composition consisting essentially of:

| | | | |
|---|---|---|---|
| $SiO_2$ | 54–58% | Ag | 0.20–0.33% |
| $B_2O_3$ | 18–22% | Cl | 0.30–0.50% |
| $Al_2O_3$ | 7–8% | Br | 0.04–0.14% |
| $Li_2O$ | 3.75–4.5% | CuO | 0.007–0.012% |

-continued

| | | | |
|---|---|---|---|
| $Na_2O$ | 0–1% | PbO | 0–0.08% |
| $TiO_2$ | 0–2% | $Sb_2O_3$ | 0–0.20% |
| $ZrO_2$ | 2–4.5% | $K_2O$ | 5.5–7.5% | and wherein the mole ratio of $Li_2O:Na_2O$ is =>9:1, molding a plus power lens of center thickness greater than 2 mm. from the glass, and heat treating the molded lens at a temperature of not over 610° C. for a time of 15–45 minutes to develop photochromic properties in the glass.

4. A method in accordance with claim 3 which comprises heat treating the lens at a temperature in the range of 575–610° C.

5. A method in accordance with claim 3 wherein the time is about 30 minutes at a temperature of about 595° C.

* * * * *